United States Patent Office 3,017,426
Patented Jan. 16, 1962

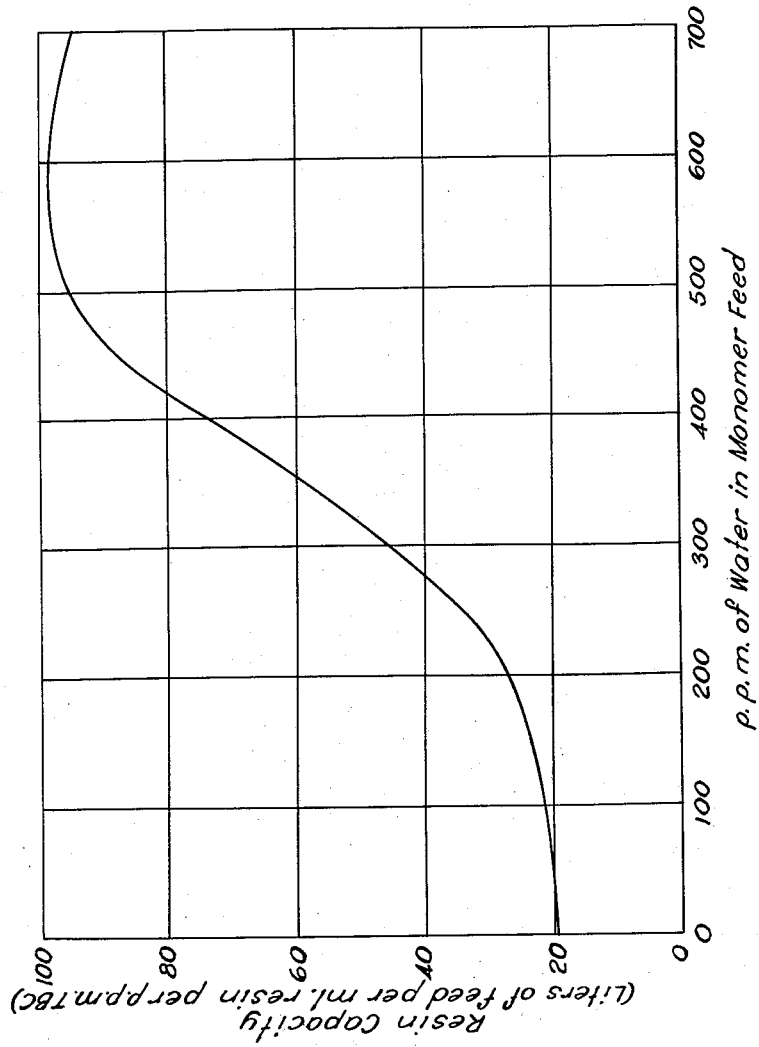

3,017,426
REMOVAL OF PHENOLIC INHIBITORS FROM ALKENYL MONOMERS
Norman R. Ruffing, James L. Amos, and Vincent D. Puzar, Midland, Mich., assignors to The Dow Chemical Company, Midland, Mich., a corporation of Delaware
Filed Mar. 3, 1958, Ser. No. 718,444
7 Claims. (Cl. 260—465.9)

This invention concerns the removal of phenolic inhibitors from alkenyl monomers. More particularly, it concerns a process for removing phenolic inhibitors from alkenyl monomers by treatment of such an inhibited alkenyl monomer with a strongly basic quaternary ammonium anion-exchange resin.

Up to the present time, phenolic polymerization inhibitors which are added to alkenyl monomers to prevent premature polymerization have been removed by a caustic wash, by distillation or by absorption with activated alumina, activated clay, anhydrous calcium sulfate and the like. Such treatments are not completely satisfactory with respect to efficiency of removal and cost. For example, some of the phenolic inhibitors have a boiling point so close to that of the inhibited monomer that distillative removal is impractical. Also, distillation equipment is costly. With respect to previously used absorbents, their relative inefficiency and/or cost render their use uneconomic.

In accordance with this invention, it has now been discovered that phenolic polymerization inhibitors can be removed substantially completely, i.e., to less than one part per million, from alkenyl monomers by treatment with a strongly basic quaternary ammonium anion exchange resin. The strongly basic quaternary ammonium anion exchange resins useful in the process of this invention are insoluble polymers and copolymers containing on the aromatic nucleus substituent groups having the formula

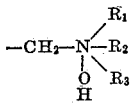

in which the $R_1$, $R_2$, $R_3$ groups are lower alkyl, lower hydroxyalkyl, or haloalkyl except fluoroalkyl. Copolymers of styrene, ethylvinylbenzene and divinylbenzene and similar copolymers containing quaternary ammonium radicals, such as are well-known in the art, are representative resin types usually employed in this invention. Exemplary of preferred copolymeric anion exchange resins are crosslinked copolymers of a major amount of styrene, a minor amount of ethylvinylbenzene and from 0.5 to 12 percent by weight of divinylbenzene, which copolymers contain either tetramethylammonium radicals or trimethylethanolammonium radicals as nuclear substituents.

In practice, there is used a water-wet quaternary ammonium anion exchange resin of the type indicated, in the hydroxyl form containing between 40 and 60 percent by weight of water, preferably between 45 and 55 percent by weight of water to give a free-flowing composition which gives good contact with alkenyl monomers. The phenolic-inhibited alkenyl monomer is adjusted to contain water between 100 p.p.m. and its saturation point, preferably between about 300 and 700 p.p.m. of water, and is then contacted with the anion exchange resin, e.g., by passing the monomer through a bed of the resin at a rate sufficient to absorb the desired amount of phenolic inhibitor, advantageously at a rate above one gal. per min. per sq. ft. of cross-sectional area of the resin column. A bed depth of about 3 ft. for example, makes possible the utilization of a maximum monomer feed rate of about 6.5 gal. per min. per sq. ft. with maximum resin capacity. Above this rate, resin capacities drop off to about 50 percent of maximum capacity with a 3 ft. deep resin bed. Where such reduction in inhibitor concentration is adequate, the process is economic at such a rate of feed. Otherwise a deeper resin bed or multiple beds in series are used at higher feed rates to make possible maximum resin capacity and maximum removal of inhibitor. Temperature has little effect on capacity of the resin or its rate of absorption. Obviously, however, the operation must be carried out above 0° C. to prevent freezing of the water-wet resin and below the softening temperature of the resin, which is usually less than 100° C.

The process of this invention is applicable to all commercial alkenyl monomers. Commercial alkenyl monomers conventionally contain no more than about one percent of phenolic inhibitor. At higher inhibitor concentrations, which are not met in commercial practice, the process of this invention can be used but is less economic. Monomer recoveries are high in this process, usually over 99 percent. As the resin absorbs more and more of a substituted phenol inhibitor and finally becomes exhausted, its color progressively changes, generally from a light tan to a red and finally to a deep black. The color change provides a ready means for following the state of exhaustion of the ion exchange resin bed. When the black color has descended to the bottom of the resin bed and inhibitor breakthrough is imminent, periodic tests for the presence of such inhibitor in the effluent monomer are made by shaking equal volumes of effluent monomer and 3 percent sodium hydroxide solution and noting the color change of the caustic layer. When a coloration occurs in the caustic layer, the presence of inhibitor is indicated for any substituted phenol inhibitor and the run is then terminated. Unsubstituted phenol is the only phenol which does not give a progressive color change with the anion exchange resin as the latter is progressively exhausted. To determine phenol in effluent monomer, the well known 4-amino antipyrine colorimetric method is used.

Both alkenylalkyl and alkenylaryl monomers containing a phenolic inhibitor can be processed by the procedures of this invention, for example, styrene, α-methylstyrene, vinyltoluene, divinylbenzene, chlorostyrene, vinyl chloride, vinylidene chloride, ethyl acrylate, methyl methacrylate, acrylonitrile, etc. The usual phenolic type inhibitors, which are free of sterically hindering groups in positions ortho to the hydroxyl group, such as p-t-butyl catechol, 4,6 - dinitro-o-cresol, 2,6-di-isopropyl-o-cresol, 3,6-dimethoxyphenol, o-nitrophenol, hydroquinone, o-phenylphenol, etc. can be substantially completely removed, i.e., to less than one p.p.m. by the practice of this invention.

The following non-limitative examples give specific embodiments and the best mode of carrying out this invention, and show advantages accruing from its practice.

*Example 1.—Removal of t-butyl catechol from styrene*

A quantity of 10 ml. (6.15 g.) of a water-wet strongly basic granular quaternary ammonium anion exchange resin cross-linked with 8 percent by weight of divinylbenzene in the hydroxide form containing about 50 percent of water was poured into a 100 ml. burette having a gauze plug at the bottom and containing 40 ml. of inhibitor-free styrene. A resin bed was thereby obtained, free of entrapped air bubbles and having a head of styrene to distribute incoming feed without excessive disturbance during the absorption cycle. A feed of styrene monomer containing 50 p.p.m. of t-butyl catechol and 400 p.p.m. of water was introduced at the top of the column at a rate of about 200 ml. per hour (1.53 gal. per min. per sq. ft. of cross-sectional area of column) and substantially inhibitor-free styrene containing less than one p.p.m. of t-butyl catechol was drawn off at the bottom at the same rate. As the resin absorbed the inhibitor and became exhausted, its color progressively changed from a light tan to a red and finally to a deep black. The run was continued until the black color had descended to the bottom of the resin bed, at which time inhibitor breakthrough was imminent. At this point, periodic tests for the presence of t-butyl catechol were made by shaking equal volumes of effluent styrene and 3 percent sodium hydroxide solution and noting the color of the caustic layer. When a pink coloration occurred in the caustic layer, the presence of t-butyl catechol was indicated, and the run was then terminated. At the point of inhibitor breakthrough, the 10 ml. of ion exchanger had reduced the inhibitor concentration of 16.41 liters of styrene from 50 p.p.m. to less than one p.p.m. On a weight basis, one pound of resin will, therefore, remove substantially 50 p.p.m. of t-butyl catechol from approximately 2400 pounds of styrene monomer.

*Example 2.—Removal of phenol from vinyl chloride*

In a pressurized system, vinyl chloride containing 300 p.p.m. of phenol was admitted to a resin column consisting of 50 ml. of a crosslinked strongly basic quaternary ammonium hydroxide anion exchange resin containing 45 percent water. The resin bed was contained in a ½ in. x 12 in. stainless steel pipe. The feed rate was varied between 200 and 400 ml. per hour. Operating column pressure was between 35 and 45 p.s.i.g. No observed pressure drop occurred over the resin bed. Product analyses showed that the phenol content was reduced to 0.4 p.p.m. in each case. Polymerization data on the products indicated normality in every respect. Capacity of the resin for removal of phenol was essentially the same as for removal of t-butyl catechol from styrene, i.e., approximately 85 liters of monomer treated per ml. of resin per p.p.m. of inhibitor.

*Example 3.—Removal of hydroquinone from ethyl acrylate*

The procedure of Example 1 was repeated with ethyl acrylate monomer containing 0.1 percent hydroquinone. Caustic washing of the treated ethyl acrylate indicated substantially all of the hydroquinone had been absorbed by the resin, since the 3 percent caustic layer remained water-white. In contrast thereto, a corresponding sample of untreated ethyl acrylate was washed with 3 percent aqueous sodium hydroxide solution (equal volumes of monomer and caustic), and the sodium hydroxide layer became brown in color.

*Example 4.—Removal of inhibitor from VCN, dichlorostyrene divinylbenzene and methyl methacrylate*

The procedure of Example 1 was repeated with acrylonitrile, dichlorostyrene, divinylbenzene and methyl methacrylate containing inhibiting amounts of t-butyl catechol in the cases of the first three and hydroquinone in the methyl methacrylate. In all cases, resin color and caustic layer lack of color indicated substantially complete removal of the inhibitors.

*Example 5.—Effect of water on resin capacity*

The relative dryness of styrene monomer containing t-butyl catechol inhibitor has a pronounced effect on resin capacity for removal of the inhibitor, the capacity being about 20 percent of maximum for anhydrous styrene. For a series of runs, shown in the figure, data for which are given in the following table, various amounts of water were dissolved in monomer and the samples were put through a resin column under rate conditions at which maximum capacity would normally be realized. For higher water concentrations, the monomer was bubbled through a water column and the water concentration was determined on the monomer just prior to entering the resin bed using Karl Fischer reagent. In some of the runs at high throughputs, it was noted that droplets of water carried over into the resin bed with the feed monomer. This addition of free water had no detrimental effect on the system. It was found that for maximum resin capacity, the water concentration of the monomer should be about 450 p.p.m. up to the saturation point. Reasonable capacity (50 percent of maximum) can be realized with water concentrations as low as 300 p.p.m. with shallow resin beds. Water concentrations as low as 100 p.p.m. are operable when deeper or multiple beds in series are used. Similar results are obtained with other alkenyl monomers.

| Water in Styrene, p.p.m. | Resin Capacity Feed, Liters/ ml. resin/ p.p.m. TBC |
|---|---|
| 0 | 1/9 |
| 230 | 2/6 |
| 280 | 4/1 |
| 300 | 4/6 |
| 410 | 7/5 |
| 480 | 9/6 |
| 550 | 9/8 |
| 650 | 9/7 |

*Example 6.—Removal of phenols from styrene monomers*

One weight percent of the following inhibitors (except 500 p.p.m. of phenol) was added to a series of samples of styrene monomer containing about 500 p.p.m. of water. A quantity of 10 ml. of each such solution was treated for one hour with 5 ml. of a strongly basic quaternary ammonium hydroxide anion exchange resin containing 45 percent water. Sample analyzed for phenol content by infrared analysis before and after treatment showed the following:

| Phenol | Percent Phenol Concentration, via Infrared | |
|---|---|---|
| | Before | After |
| Phenol | 500 p.p.m. | nil. |
| 4,6-dinitro-2-methylphenol | ca. 1% | trace. |
| 2,6-diisopropylphenol | ca. 1% | trace. |
| 2,6-dimethylphenol | ca. 1% | trace. |
| 2,6-dimethoxyphenol | ca. 1% | nil. |
| 2,6-dichloro-4-nitrophenol | ca. 1% | nil. |
| 2,4,6-trichlorophenol | ca. 1% | nil. |
| p-t-butyl catechol | ca. 1% | nil. |
| 2-nitrophenol | ca. 1% | nil. |
| hydroquinone | ca. 1% | nil. |

What is claimed is:

1. A method for removing a phenolic inhibitor from an alkenyl monomer which method comprises contacting an alkenyl monomer containing a phenolic inhibitor and a proportion of water which is between 100 p.p.m. and 700 p.p.m. with a strongly basic quaternary ammonium anion exchange resin in the hydroxide form containing between 40 and 60 percent by weight of water and recovering alkenyl monomer from which phenolic inhibitor has been removed.

2. The method of claim 1 wherein the monomer is styrene.

3. The method of claim 1 wherein the monomer is acrylonitrile.

4. The method of claim 1 wherein the monomer is vinyl chloride.

5. The method of claim 1 wherein the monomer is ethyl acrylate.

6. The method of claim 1 wherein the monomer is divinylbenzene.

7. The method of claim 1 wherein the monomer is methyl methacrylate.

(References on following page)

References Cited in the file of this patent

UNITED STATES PATENTS

| | | |
|---|---|---|
| 2,704,770 | Anspon | Mar. 22, 1955 |
| 2,812,312 | Wilkinson | Nov. 5, 1957 |
| 2,836,615 | Heininger et al. | May 27, 1958 |

OTHER REFERENCES

Samuelson: "Ion Exchangers in Analytical Chemistry," 1953 p. 93.

Anderson et al.: Industrial and Engineering Chemistry, vol. 47, January 1955, pp. 71-75.

UNITED STATES PATENT OFFICE
CERTIFICATE OF CORRECTION

Patent No. 3,017,426    January 16, 1962

Norman R. Ruffing et al.

It is hereby certified that error appears in the above numbered patent requiring correction and that the said Letters Patent should read as corrected below.

Column 4, first table, column 2 thereof for

| | |
|---|---|
| 1/9 | 19 |
| 2/6 | 26 |
| 4/1 | 41 |
| 4/6 | 46 |
| 7/5  read | 75 |
| 9/6 | 96 |
| 9/8 | 98 |
| 9/7 | 97 |

Signed and sealed this 17th day of July 1962.

(SEAL)
Attest:
ERNEST W. SWIDER
Attesting Officer

DAVID L. LADD
Commissioner of Patents